Nov. 19, 1957 D. H. PEDERSEN 2,813,558
ROTATABLE CUTTING TOOL WITH DETACHABLE BLADE
Filed Feb. 23, 1956 2 Sheets-Sheet 1

INVENTOR.
Dane H. Pedersen
BY
E. Emmett Thompson
Attorney.

Nov. 19, 1957  D. H. PEDERSEN  2,813,558
ROTATABLE CUTTING TOOL WITH DETACHABLE BLADE
Filed Feb. 23, 1956  2 Sheets-Sheet 2

INVENTOR.
Dane H. Pedersen
BY D. Emmett Thompson
Attorney.

United States Patent Office 2,813,558
Patented Nov. 19, 1957

2,813,558

ROTATABLE CUTTING TOOL WITH DETACHABLE BLADE

Dane H. Pedersen, Camillus, N. Y., assignor to The Porter-Cable Machine Company, Syracuse, N. Y., a corporation of New York Application February 23, 1956, Serial No. 567,169

7 Claims. (Cl. 144—230)

This invention relates to rotary cutters of the type having a replaceable blade. The cutter of my invention is particularly well suited for use in portable, high-speed, wood working machine, such as routers and planes. Machines of this type are used extensively by contractors and are taken to the job. At the present time, most cutters used on these machines are of the solid type and are expensive. In order to prevent loss of time on the job in the event a cutter becomes dull or damaged, it is necessary for the operator to carry along extra ones of these expensive cutters.

This invention has as an object a replaceable blade rotary cutter consisting of a body member and a replaceable blade, the structural arrangement being such that the body member can be manufactured at relatively low cost and the replaceable blades are in the form of flat plates which can be very economically produced, quickly and conveniently mounted in the body without danger of the blades becoming detached from the body when the cutter is in use.

The invention consists in the novel features and in the combinations and constructions hereinafter set forth and claimed.

In describing this invention, reference is had to the accompanying drawings in which like characters designate corresponding parts in all the views.

In the drawings—

Figure 2:
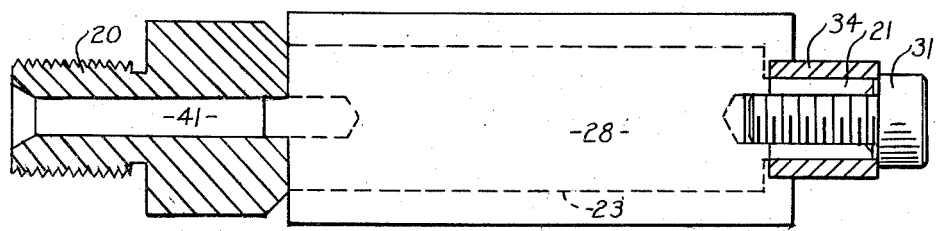
Figure 2 is a lengthwise sectional view taken on line 2—2, Figure 1, with the cutter blade shown in elevation.
Figure 1:
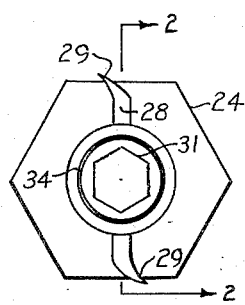
Figure 1 is an end elevational view of a cutter embodying my invention, the view looking to the left, Figure 2.
Figure 3:
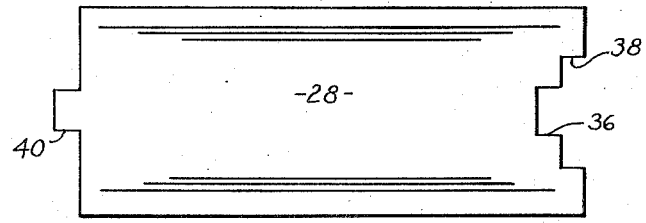
Figure 3 is an elevational view of the cutter blade shown in Figures 1 and 2.
Figure 4:
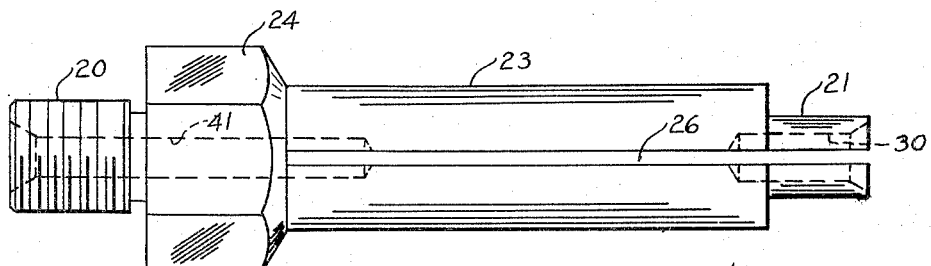
Figure 4 is a side elevational view of the body of the cutter rotated 90° from the position shown in Figure 2.
Figure 5:
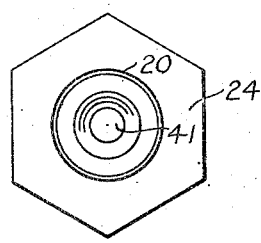
Figure 5 is an end view of the body looking to the right, Figure 4.
Figure 6:
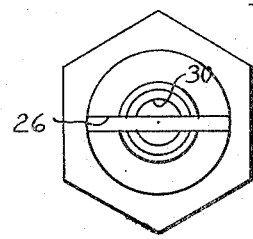
Figure 6 is an end view of the body looking to the left, Figure 4.

Referring to Figures 1 to 6, the cutter comprises a body member formed at one end with a shank portion 20 for driving the cutter. This shank portion may be of any suitable shape, as shown it may be externally threaded to screw into the spindle of the machine on which the cutter is used. The opposite end of the body is formed with a cylindrical portion 21 of reduced diameter. The shank portion and the cylindrical portion are connected by an intermediate portion 23 which is here shown as a cylindrical formation and provided, in proximity to the driving shank 20, with a hexagonal enlargement 24 for the reception of a wrench for attaching and detaching the cutter to the spindle of the machine. The body is formed with a diametrically disposed slot 26 which extends axially inwardly through the cylindrical end portion 21, and the intermediate body section 23. A cutter blade 28 is positioned in the slot 26 and has at least one side cutting edge extending radially from the body. As here shown, both edges of the blade 28 provide cutting edges 29. These blades are stamped from sheet metal suitable for the purpose which, after formation, may be hardened and ground.

The blades 28 are inserted into the body by axial movement through the slot 26. The slotted cylindrical end portion 21 of the body is formed with an internally axially positioned bore 30 to receive a screw 31 forming part of the blade retaining means. In this arrangement, the cylindrical end portion 21 is snugly encircled by a collar 34 positioned intermediate the head of the screw 31 and the contiguous end of the blade 28. This arrangement functions, when the screw 31 is tightened, to move the blade axially against the closed end of the slot 26 to thus clamp the blade in the body.

The end of the blade 28, contiguous to the cylindrical portion 21 of the body, is formed with a centrally located notch 36 to provide clearance for the inner end of the screw 31. This end portion of the blade is also formed with a larger notch 38 to receive the contiguous end of the collar 34. This arrangement correctly centers the blade 28 in the body and prevents radial displacement of the blade when the cutter is in use. The collar 34 also functions to prevent the bifurcated or slotted end portion 21 from distorting or moving radially outwardly when the screw 31 is tightened. Preferably, the opposite end of the blade is formed with a tang 40 which is positioned in an axially extending hole 41 extending through the shank end of the body. This arrangement also centers the blade 28 and prevents any possibility of it moving radially. The hole 41 also serves to receive a knock-out pin to facilitate the removal of the blade from the body.

Figure 10:
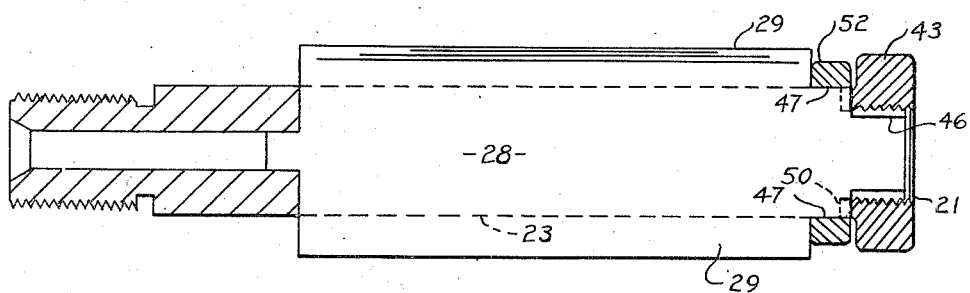
Figure 10 is a slightly modified arrangement from that shown in Figures 1 to 6, the view being a lengthwise sectional view similar to Figure 2.
Figure 11:
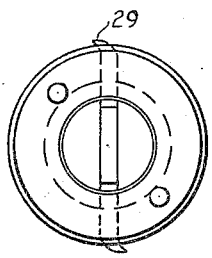
Figure 11 is an end elevational view looking to the left, Figure 10.

The arrangement in Figures 10 and 11 is substantially the same as that in Figures 1 to 6, except that the cylindrical end portion 21 of the body is threaded externally to receive a blade retaining nut 43. In this construction, the cutting edges 29 of the blade 28 terminate remote from the cylindrical end portion 21 of the body, see Figure 10, and the blade is formed with a tang portion 46 positioned in the slotted end portion 21. The side edges of the blade, indicated at 47, Figure 10, are ground so as to be flush with the peripheral surface of the body and extend slightly beyond the end 50 of the body. The nut 43 is threaded on to the end portion 21 engaging the shouldered end of the blade 28, as shown in Figure 10. A collar 52 is positioned on the body intermediate the nut 43 and the contiguous ends of the cutting edges 29, this collar engaging the ground surfaces 47 of the blade and thus centering it on the body. The width of the tang 46 of the blade is somewhat less than the diameter of the root of the thread of the cylindrical portion 21 so as not to interfere with the operation of the nut 43. The tang 46 here serves to prevent inward radial distortion of the slotted section 21 when the nut 43 is tightened.

Figure 8:
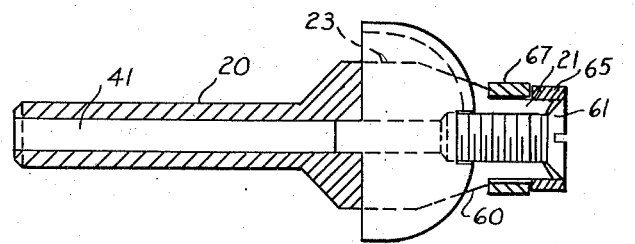
Figure 8 is a lengthwise sectional view taken on line 8—8, Figure 7, with the cutter blade shown in elevation.
Figure 7:
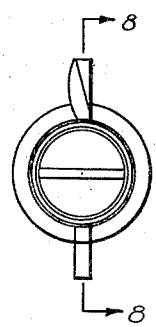
Figure 7 is an end elevational view of a modified form of cutter.
Figure 9:
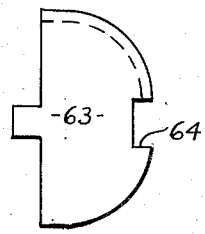
Figure 9 is an elevational view of the cutter shown in Figures 7 and 8.

In the arrangement shown in Figures 7, 8 and 9, the intermediate portion 23 of the body is of conical formation, as indicated at 60. In this arrangement, the cylindrical end portion 21 is also internally threaded to receive a blade clamping screw 61. In this instance, the formed cutter blade 63 is formed with a notch 64 comparable to the notch 36 in Figure 3, and the inner end of the screw 61 engages the bottom of this notch to clamp the blade in the slot. The screw is proportioned, however, so that the head of the screw does not engage the outer end of the cylindrical portion 21 before the screw operatively engages the blade in clamping relation. The outer end of the end portion 21 is snugly encircled by a collar 65 which functions in the same manner as the collar 34—that is, to restrain undue radial distortion of the slotted portion 21 when the screw 61 is tightened. In this arrangement, a second collar 67 is positioned on the inner part of the end portion 21 and is freely journalled thereon, and serves as a guide collar when the cutter is used in routing machines.

As shown in Figure 8, the hole 41 may extend the entire length of the body to receive the knock-out pin.

It will be apparent that the structure described provides a cutter economical to produce and the blades 28 can be produced at a particularly low cost, they being formed by stamping.

What I claim is:

1. A replaceable blade rotary cutting tool comprising a body formed with a cylindrical portion at one end and having a driving shank portion at its opposite end, said portions being connected by an intermediate portion, said body being formed with a diametrically disposed slot extending axially through said cylindrical portion and intermediate portion toward said shank for the reception of a cutter blade upon axial movement of the same relative to the body, a cutter blade positioned in said slot and having at least one cutting edge extending radially from the body said blade and body being formed with interlocking centering parts, a blade retaining means for detachably securing the blade in said slot including a member having threaded connection with said cylindrical end portion of the body, and means for preventing radial distortion of the slotted cylindrical end portion upon tightening of said member.

2. A replaceable blade rotary cutting tool as set forth in claim 1 wherein said blade is formed with a tang extending into said slotted cylindrical end portion.

3. A replaceable blade rotary cutting tool comprising a body formed at one end with a driving shank and being of cylindrical formation at its opposite end, said body being formed with a diametrically disposed slot extending axially of the body through said cylindrical end portion toward said shank for the reception of a cutter blade upon axial movement thereof relative to the body a tap-out hole extending through said shank and intersecting said slot, a cutter blade positioned in said slot and having a cutting edge portion extending radially from the body said cutter blade being formed with a centering tang extending into said hole, said cylindrical end portion having an internally threaded axially positioned bore, a blade retaining screw threaded into said bore for engagement with the contiguous end of the blade, and a collar encircling said cylindrical end portion to restrain expansion thereof by said screw.

4. A replaceable blade rotary cutting tool as defined in claim 3 wherein the end of said blade contiguous to the cylindrical end portion of the body is formed with a notch to receive the inner end of said retaining screw.

5. A replaceable blade rotary cutting tool comprising a body formed at one end with a driving shank portion and having a cylindrical portion at its opposite end, said shank and cylindrical portions being connected by an intermediate portion, said body being formed with a diametrically disposed slot extending axially through said cylindrical end portion and into the intermediate portion of the body for the reception of a cutter blade upon axial movement thereof relative to the body, said cylindrical end portion of the body being formed with an internally threaded bore positioned axially thereof, a blade retaining screw threaded into said bore and engaging the contiguous end of said blade for clamping the same against the closed end of said slot, a collar snugly encircling the outer end of said cylindrical end portion to restrain expansion thereof upon tightening of said retaining screw, and a guide collar rotatably mounted on said cylindrical end portion of the body intermediate said snug collar and the contiguous end of said blade.

6. A replaceable blade rotary cutting tool comprising a body formed with a cylindrical end portion at one end and having a driving shank portion at its opposite end, said portions being connected by an intermediate portion, said body being formed with a diametrically disposed slot extending axially through said cylindrical end portion into said intermediate portion for the reception of a cutter blade upon axial movement thereof relative to the body, a cutter blade positioned in said slot and having at least one cutting edge extending radially from the body, said cylindrical end portion of the body being threaded externally, a blade retaining nut threaded on said cylindrical end portion for engagement with the contiguous end of said blade for moving the same against the opposite closed end of said slot, and said contiguous end portion of the blade being formed with a tang extending into said slotted cylindrical end portion.

7. A replaceable blade rotary cutting tool comprising a cylindrical body having a driving shank at one end and a cylindrical end portion of reduced diameter at its opposite end, said body being formed with a diametrically disposed blade receiving slot extending axially inwardly from said cylindrical end portion towards said shank, a cutter blade positioned in said slot and having at least one cutting edge extending radially from the body and terminating remote from said cylindrical end portion, said cylindrical end portion being formed with external threads, a blade retaining nut threaded on said end portion and engaging the contiguous end of said blade for clamping the same in said slot, said blade being formed with a tang extending into the slotted cylindrical end portion of the body to prevent radial distortion thereof upon tightening said nut, and a guide collar journalled on said body intermediate said nut and the contiguous end of said cutting edge of the blade.

References Cited in the file of this patent

UNITED STATES PATENTS

| 25,286 | Storer et al. | Aug. 30, 1859 |
| 815,549 | Nelson | Mar. 20, 1906 |
| 2,280,295 | Monteros | Apr. 21, 1942 |

FOREIGN PATENTS

| 132,343 | Germany | July 8, 1902 |